(12) United States Patent
Serra Lleti et al.

(10) Patent No.: US 12,518,355 B2
(45) Date of Patent: Jan. 6, 2026

(54) TRAINING A DENOISING MODEL FOR A MICROSCOPE (71) Applicant: LEICA MICROSYSTEMS CMS GMBH, Wetzlar (DE)

(72) Inventors: Jose Miguel Serra Lleti, Wetzlar (DE); Mate Beljan, Wetzlar (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 542 days.

(21) Appl. No.: 17/968,819

(22) Filed: Oct. 19, 2022

(65) Prior Publication Data

US 2023/0126326 A1 Apr. 27, 2023

(30) Foreign Application Priority Data

Oct. 26, 2021 (EP) .................................... 21204605

(51) Int. Cl.
*G06T 5/70* (2024.01)
(52) U.S. Cl.
CPC ...... *G06T 5/70* (2024.01); *G06T 2207/10056* (2013.01); *G06T 2207/10064* (2013.01); *G06T 2207/10144* (2013.01); *G06T 2207/20081* (2013.01); *G06T 2207/20084* (2013.01)
(58) Field of Classification Search
CPC ............. G06T 5/70; G06T 2207/10056; G06T 2207/10064; G06T 2207/10144; G06T 2207/20081; G06T 2207/20084
USPC ....................................................... 382/157
See application file for complete search history.

(56) References Cited

U.S. PATENT DOCUMENTS

2020/0051217 A1  2/2020  Shen et al.

FOREIGN PATENT DOCUMENTS

| CN | 111 476 125 A | 7/2020 |
| EP | 3996034 A1 | 5/2022 |
| WO | WO 2020/172123 A1 | 8/2020 |
| WO | WO 2022/028694 A1 | 2/2022 |

OTHER PUBLICATIONS

Roels, Joris, et al. "An interactive ImageJ plugin for semi-automated image denoising in electron microscopy." Nature communications 11.1 (2020): 771. (Year: 2020).*
Moseley, Ben, et al. "Extreme low-light environment-driven image denoising over permanently shadowed lunar regions with a physical noise model." Proceedings of the IEEE/CVF Conference on Computer Vision and Pattern Recognition. 2021. (Year: 2021).*

(Continued)

*Primary Examiner* — Jonathan S Lee
(74) *Attorney, Agent, or Firm* — LEYDIG, VOIT & MAYER, LTD.

(57) ABSTRACT

A computer-implemented method for training a denoising model for a microscope includes obtaining a plurality of training images with different image acquisition settings taken with the microscope, the plurality of training images including noise caused by the microscope's hardware, and training the denoising model using the plurality of training images obtained with different image acquisition settings, thereby making the denoising model specific to the microscope's hardware.

20 Claims, 4 Drawing Sheets (56) References Cited

OTHER PUBLICATIONS

Wei, Kaixuan, et al. "A physics-based noise formation model for extreme low-light raw denoising." Proceedings of the IEEE/CVF Conference on Computer Vision and Pattern Recognition. 2020. (Year: 2020).*

Mandracchia, B. et al. "Fast and accurate sCMOS noise correction for fluorescence microscopy," Nat Commun 11, 94 (2020), UK, Jan. 3, 2020, pp. 1-12.

Alexander Krull, et al., "Probabilistic Noise2Void: Unsupervised Content-Aware Denoising," arXiv:1906.00651, US, Jun. 4, 2019, pp. 1-9.

Alexander Krull et al., "Noise2Void—Learning Denoising From Single Noisy Images," IEEE/CVF Conference on Computer Vision and Pattern Recognition (CVPR), Jun. 2019, US, pp. 1-9.

Ruofan Zhou et al., "W2S: Microscopy Data with Joint Denoising and Super-Resolution for Widefield to SIM Mapping", Aug. 23, 2020 (Aug. 23, 2020), Computer Vision—ECCV 2020 : 16th European Conference, Glasgow, UK, Aug. 23-28, 2020 : Proceedings; [Lecture Notes in Computer Science; ISSN 0302-9743], pp. 474-491, XP047589135.

Wesley Khademi et al., "Self-Supervised Poisson-Gaussian Denoising", 2021 IEEE Winter Conference on Applications of Computer Vision (WACV), IEEE, Jan. 3, 2021 (Jan. 3, 2021), pp. 2130-2138, XP033926345.

* cited by examiner

TRAINING A DENOISING MODEL FOR A MICROSCOPE

CROSS REFERENCE TO RELATED APPLICATIONS

This application claims benefit to European Patent Application No. EP 21204605.6, filed on Oct. 26, 2021, which is hereby incorporated by reference herein.

FIELD

The present invention generally concerns the field of data processing in microscopy applications, and in particular to improved techniques for denoising microscopy images using machine-learning.

BACKGROUND

In certain fields of microscopy, such as fluorescent microscopy to study cellular structures or living samples, it is oftentimes necessary to make a trade-off between the light exposure and the quality of the image to be obtained to minimize unwanted effects, such as photobleaching and phototoxicity.

Typically, researchers try to minimize photobleaching and phototoxicity by minimizing the energy input, which may be achieved by reducing exposure time or gain at the cost of increasing the amount of noise. In experiments where many objects are evaluated (e.g. high-throughput screening in a cell culture), fluorescence imaging should be as fast as possible but holding enough quality for posterior analysis.

In this context, image denoising has become a more and more important tool. Image denoising generally refers to attempts of restoring images contaminated by additive noise. Such noise may originate from electronic sources, e.g. gaussian noise, salt and pepper, shot noise or sample-dependent high frequency noise due to quantization, sensitivity or heat from camera sensors.

The topic of denoising camera images has been the subject of scientific research. For example, the article "Fast and accurate sCMOS noise correction for fluorescence microscopy" by Mandracchia, B., Hua, X., Guo, C. et al. (Nat Commun 11, 94 (2020). https://doi.org/10.1038/s41467-019-13841-8) discloses a content-adaptive algorithm for the automatic correction of sCMOS-related noise for fluorescence microscopy. The technique combines camera physics and layered sparse filtering to reduce noise sources in a sCMOS sensor while preserving the fine details of the signal.

The articles "Probabilistic Noise2Void: Unsupervised Content-Aware Denoising" by Alexander Krull, et al. (arXiv:1906.00651) and "Noise2Void—Learning Denoising From Single Noisy Images" by Alexander Krull, et al. (IEEE/CVF Conference on Computer Vision and Pattern Recognition (CVPR), 2019) disclose a method to train convolutional neural networks to predict per-pixel intensity distributions in order to obtain a complete probabilistic model for the noisy observations and true signal in every pixel.

Besides these scientific approaches, conventional microscopes typically use generic denoisers either in cameras or as postprocessing routines after image acquisition. Therefore, the denoising techniques employed in practice have limited effects.

SUMMARY

In an embodiment, the present disclosure provides a computer-implemented method for training a denoising model for a microscope, the method comprising obtaining a plurality of training images with different image acquisition settings taken with the microscope, the plurality of training images comprising noise caused by the microscope's hardware, and training the denoising model using the plurality of training images obtained with different image acquisition settings, thereby making the denoising model specific to the microscope's hardware.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

In an embodiment, the present invention provides an improved microscopy image denoising technique and thereby overcome the above-mentioned disadvantages of the prior art at least in part.

In an embodiment of the invention, a computer-implemented method for training a denoising model for a microscope is provided. The method may comprise obtaining a plurality of training images with different image acquisition settings taken with the microscope, the plurality of training images comprising noise caused by the microscope's hardware. The method may further comprise training the denoising model using the plurality of training images obtained with different image acquisition settings, thereby making the denoising model specific to the microscope's hardware.

Accordingly, unlike the generic denoisers commonly used in conventional cameras, which are neither specific to the sample that is being imaged nor to the used image acquisition settings, the above aspect of the invention allows the denoising model (also referred to as "image denoising model" herein) to be tailored to the hardware of the microscope, and yet, it can adapt to new experimental circumstances. In other words, while conventional solutions typically rely on denoising models that work for anything, i.e. any microscope, for every image that is taken by such microscope, the above embodiment of the invention generates a denoising model that is very specifically tailored to the concrete microscope hardware.

In an aspect, the different image acquisition settings may be chosen such that the plurality of training images have different signal-to-noise ratios. This ensures that the model, once trained with the training images, reflects the nature of the noise generated by the microscope's hardware very accurately.

The step of obtaining the plurality of training images with different image acquisition settings may be performed in accordance with a predefined protocol, the predefined protocol defining the different image acquisition settings. Accordingly, this aspect of the method ensures that a sufficient number of training images are acquired and that the set of training images covers the necessary image acquisition settings for training the denoising model sufficiently well.

The predefined protocol may define a plurality of exposure times, preferably a gradient of exposure times. Optionally, the predefined protocol may define a plurality of illumination settings for each exposure time. Accordingly, this results in a set of training images that covers the range of noise causes for the microscope particularly well.

Preferably, the plurality of training images are images without a sample or images with only a sample carrier taken with the microscope (also referred to as "blank images", "dark images" or "open shutter images" herein, the purpose of such images being that the optical path is imaged without the presence of a sample). This way, the training images directly reflect any noise induced by the hardware of the microscope at hand, regardless of any additional noise that may be induced by the content of the image.

In an aspect of the invention, the denoising model may be trained to take account of each camera, objective, filter, optical path and/or modality of the microscope. For example, the denoising model may comprise a separate model for at least some of the cameras, objectives, filters, optical paths and/or modalities of the microscope, and/or a combined model for at least some of the cameras, objectives, filters, optical paths and/or modalities of the microscope. Accordingly, this allows to obtain a denoising model that is particularly tailored to the specific hardware of the microscope.

Moreover, a computer-implemented method for training a denoising model for a microscope is provided, which may comprise obtaining a plurality of images of a sample with different image acquisition settings taken with the microscope. The plurality of images of the sample are denoised using a denoising model that has been trained using any of the methods disclosed herein, and the plurality of images of the sample comprise noise caused by the sample. The method may further comprise training the denoising model, or a copy thereof, using the plurality of images of the sample, thereby making the denoising model, or the copy thereof, specific to the microscope's hardware and the sample.

Accordingly, this aspect attempts to learn the noise and adapt the model not only to the specific hardware used, but then also removes the specific noise inherent to the sample in the microscope. Images can then be obtained with higher signal-to-noise ratio (SNR) where the noise is not present. Using this method, a denoising model is generated that is very specifically tailored to the concrete microscope hardware (due to the initial training), and after the second training process, the embodiment creates the multiplicative effect of being specifically tailored also to the sample at hand.

In an aspect, the step of obtaining the plurality of images of the sample with different image acquisition settings may be performed in accordance with a predefined protocol, the predefined protocol defining the different image acquisition settings. The predefined protocol may be the same protocol which has been used to obtain the plurality of training images. This way, the pre-defined protocol can be efficiently reused for training the denoising model in both phases of the training.

In an aspect, the method may comprise saving the trained denoising model which is specific to the microscope's hardware and the sample for use with other samples, in particular similar types of samples. This way, the trained denoising model can be used even more synergistically for other, in particular similar types of samples without the need to train the model specifically for these types of samples.

The image acquisition settings used for obtaining the plurality of training images and/or the plurality of images of the sample may comprise at least one of gain setting, exposure time or illumination. More generally speaking, embodiments of the invention support any type of image acquisition settings that are relevant for training the denoising model.

In certain implementations, the denoising model is, or comprises, a machine-learning model, an artificial neural network, a convolutional neural network, in particular a U-Net, and/or a generative adversarial network. However, the particular type of denoising model or denoising algorithm is not critical for certain embodiments of the invention, as long as such model or algorithm lends itself to the training processes disclosed herein.

Also provided is a data processing apparatus comprising means for carrying out any of the methods disclosed herein, as well as a computer program with a program code for performing any of the methods disclosed herein when the computer program is run on a processor. Lastly, also a trained denoising model for a microscope is provided, the model being trained in accordance with any of the methods disclosed herein.

Embodiments of the invention provide improved techniques for training a denoising model for a microscope. Particular embodiments will be described which concern a workflow that combines the used microscope with the denoising algorithm to ultimately reduce the amount of tuning normally needed by the user.

The inventors have found that a way of understanding the problem of denoising is to consider ideal pictures (with high signal-to-noise ratio, SNR) together with a mathematical distribution that adds some random values to each pixel of the image obtained. This function can be modelled, for example, in the case of fluorescence, using a Poisson-Gaussian distribution where Poisson noise (also called shot noise) is the dominant source.

More specifically, an image can be considered as $$F = M*X + S + N$$

where X is the clear image, M is multiplicative noise, such as speckles, S is additive sparse noise, such as stripes or changes in illumination caused by a different sensitivity of the camera regions, typically following a Laplace distribution and caused mostly due to artefacts in imaging instruments (such as the camera), and N is additive gaussian noise, which usually is sample-independent if enough photons are captured by the camera, but if not, is a Poisson distribution which variance is dependent of the sample imaged.

The inventors have further found that the noise can be broken into two components: Noise associated with the camera/hardware electronics, where the image is affected by distortions, e.g. in the lens system (objective, filters, . . . ), and noise inherent to the sample (typically associated with fluorescence or transmitted light).

Embodiments of the invention provide a workflow to learn each of these noise components independently and combine them in one workflow for sample acquisition in the microscope.

Figure 1:
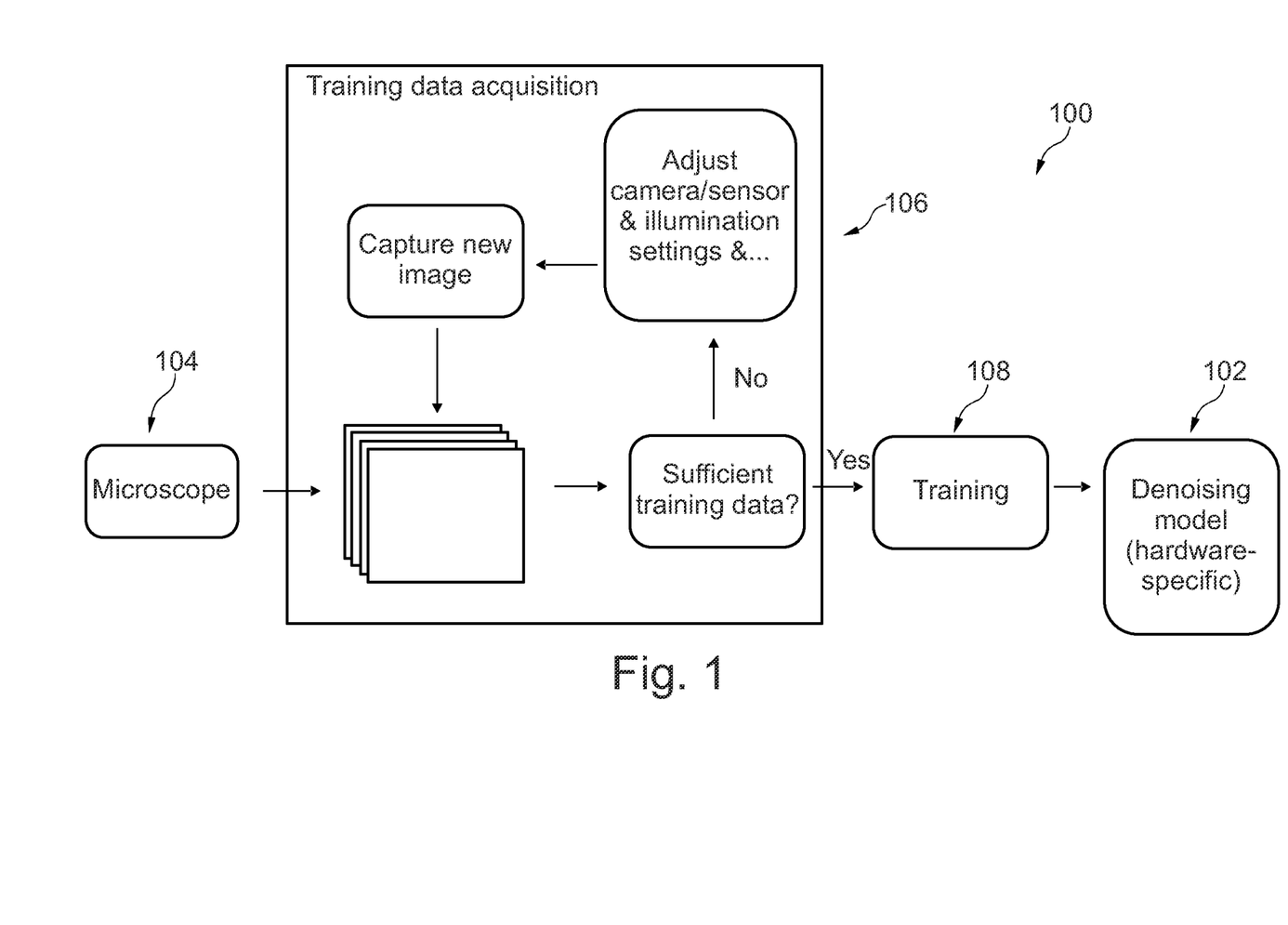
FIG. 1 illustrates a flow chart for a method for training a hardware-specific denoising model for a microscope in accordance with embodiments of the invention.

FIG. 1 shows a flowchart of a method 100 for training a denoising model for a microscope in accordance with an embodiment of the invention.

The denoising model to be trained is, or comprises, a machine-learning model, in particular an artificial neural network such as a convolutional neural network (CNN). In certain embodiments, the model may be a U-Net and/or a generative adversarial network (GAN). Yet other embodiments may use a generic denoising model as mentioned in the introduction above. In still other embodiments, the denoising model may be a model as disclosed in European patent application No. 20206032.3 titled "Methods and systems for training convolutional neural networks".

The denoising model may comprise a single machine-learning model for the associated microscope 104, or a set of machine-learning models. For example, a specific noise model may be associated with each camera and/or optical path. It would also be possible to generate models for each objective and/or filter. In yet another embodiment, a denoising model is provided for each microscope modality, e.g., confocal, multiphoton, widefield.

Referring back to the method 100 of FIG. 1, in step 106 (labelled "training data acquisition"), a plurality of training images with different image acquisition settings are obtained. In the illustrated embodiment, this includes capturing an image with the microscope 104, adjusting the image acquisition settings of the microscope 104, capturing another image, and so on, until sufficient training data is available (see the "yes" branch in FIG. 1). During this process the shutter of the microscope can be opened and blank images (also referred to as "dark" images) can be acquired for training purposes with different acquisition settings (e.g. gain, exposure time and/or objectives). Since the background is expected to be homogeneous when taking the dark images, this will result in data as reference to model.

The image acquisition process may be performed in accordance with a pre-defined routine, protocol or script. In one embodiment, an expert may create a configurable routine that lists the settings needed to learn the noise model optimally for the specific microscope (e.g. automatic changes in illumination, exposure, gain, etc.) in order to provide comprehensive training data (acquiring low quality and high quality data for validation of optimal conditions).

In another embodiment, an automated, configurable routine, protocol or script is provided which gathers training images under different conditions in a systematic way. One embodiment may involve using a gradient of exposure times, and for each exposure time, additionally varying the intensity of light. This way, it is possible to obtain different images with different SNRs. The resulting set of images at different SNRs can be used as training material.

Step 106 may be performed during service, e.g. just after manufacturing, or by saving the setup at the customer site when the operating conditions change. This procedure can be applied for any type of light microscopy (e.g. bright field, dark field, fluorescence).

After sufficient training data has been obtained, the denoising model is trained with the training images in step 108, resulting in a denoising model 102 that is now specifically adapted to the noise of the particular microscope 104 (since this is the microscope which was used to capture the training images).

Some microscopes may have template matrices or the like that correct for fixed errors, typically referred to as Flat Field Correction (see e.g. https://www.adimec.com/which-types-of-flat-field-corrections-exist-and-why-it-matters-for-high-resolution-cameras/). However, these methods only solve static errors. By contrast, embodiments of the invention capture the dynamics of the noise, i.e. how statistically the error is distributed in the absence of a sample, which is mostly due to thermal noise and specific electronics.

In the case of fluorescence microscopy, it might be helpful to use a probe sample to help to model more complex interactions. Modelling perfectly the noise here can be extremely difficult. Among other factors, there may be a dependency on the concentration and type of fluorophore, cross excitation and cross emission contamination in different channels (in some cases autofluorescence) and/or differences due to refractive indexes which create complex scattering effects. From the microscope side, there may be influence of the impulse response (point spread function; PSF), the type of illumination beam, the energy (laser intensity and/or gain) and/or exposure time. There may be even further factors that influence the final image. Accordingly, when the image is produced, the noise has a distribution that depends on the sample. Therefore, an embodiment of the invention, in particular in the case of fluorescence microscopy, involves a second model, or an additional training of the above-explained model, which will be described in the following.

Figure 2:
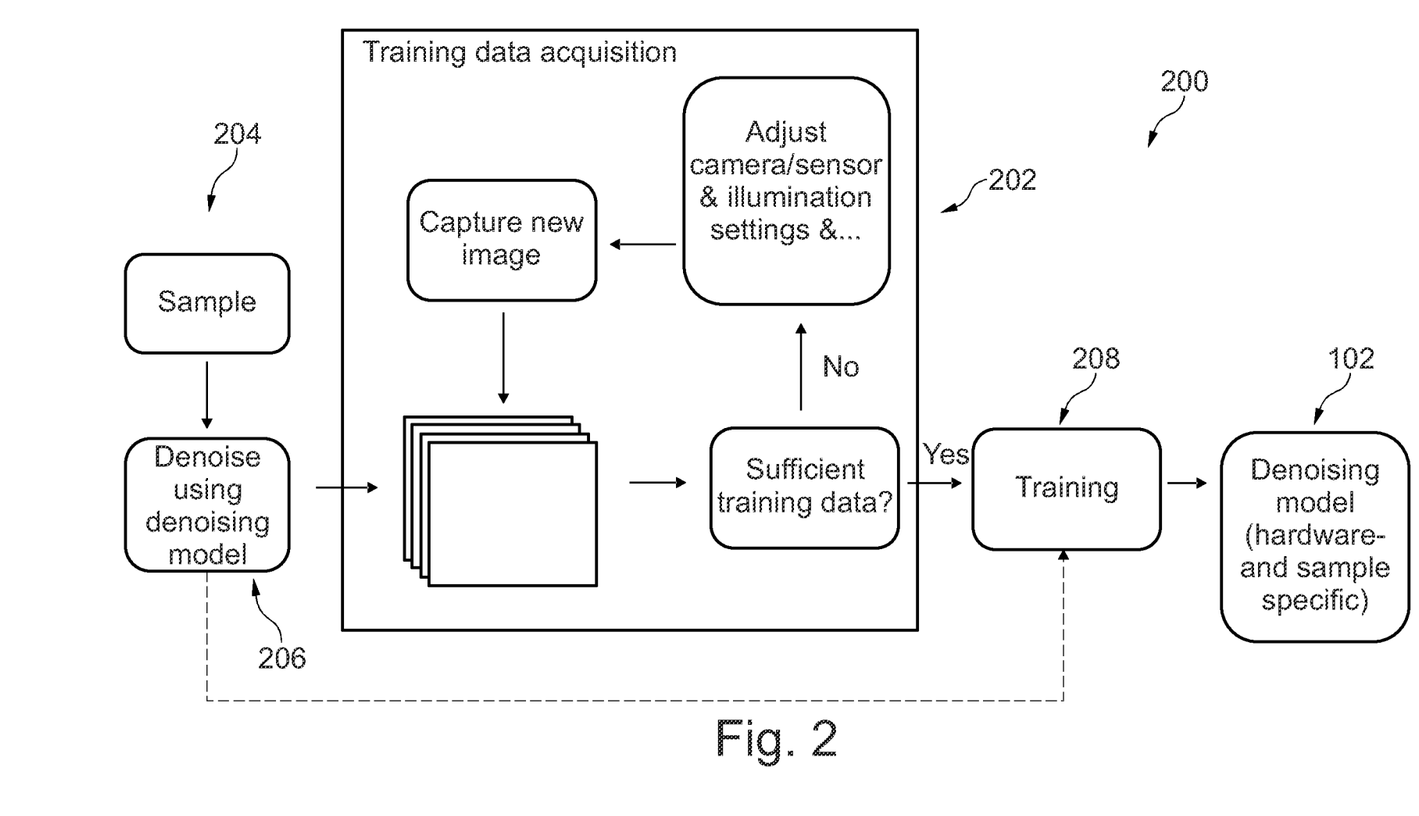
FIG. 2 illustrates a flow chart for a method for training a hardware- and sample-specific denoising model for a microscope in accordance with embodiments of the invention.

FIG. 2 shows a flowchart of another method 200 for training a denoising model for a microscope in accordance with an embodiment of the invention. In the illustrated embodiment, the hardware-specific denoising model 102 which was the result of the method 100 serves as input into the method 200, and is used as a basis for further training. This time, however, the training is not done using blank training images, but images of a sample 204. Which are denoised in step 206 using the hardware-specific denoising model 102. Similar to step 106 in FIG. 1, also in the method 200 of FIG. 2, multiple training images are acquired using different image acquisition settings, which is illustrated in step 202 of FIG. 2. Once a sufficient amount of training images has been acquired, the denoising model 102 is trained in step 208, resulting in a denoising model 102 which is both hardware- and sample-specific, i.e. which takes account both of the hardware-related noise of the particular microscope and the noise induced by the sample 204 itself.

It shall be understood that the described methods 100 and 200 may be performed in different combinations in certain embodiments. For example, method 100 may be performed at the manufacturer as an initial training of the denoising model, regardless of the type of microscope used. In the above-mentioned case of fluorescence microscopy, both of the methods 100 and 200 may be performed at the manufacturer of the microscope, as explained. In both cases then, the method 200 may be repeated by the customer to obtain an even more fine-tuned denoising model, as will be explained in more detail further below.

Concerning the different image acquisition settings, also in the method 200 these setting may be changed in accordance with a pre-defined script or routine, which may be the same routine as used in the method 100. This applies in particular is the user has some samples 204 to spare to allow acquiring a sufficient amount of training images.

On the other hand, acquiring the second set of training images (those with the sample 204) is generally more sensitive as compared to acquiring the first set of training images (the blank images), because the sample 204 may be damaged or destroyed by taking too many images. Accordingly, acquiring the second set of training images may involve a user-defined routine. In certain embodiments, however, it is still possible to automate this routine at least in part, e.g. by providing certain guidelines to the user (such as "if you use different exposure times, you can go until exposure setting . . . ").

In an embodiment, an overall workflow for training the denoising model comprises the following:

- In the factory, a model is trained for each general configuration. The resulting set of models is referred to as "raw" models.
- In the case of fluorescence, some fixed probes are inserted (e.g. beads, cells or a model organism such as a zebra fish), i.e. a number of random samples. The resulting set of models is referred to as "fluo" models. In the case of NN, the basis for training (pretrained model) will be the raw model.
- When the user receives the microscope, he/she can use the "fluo" models (the user will not be aware of the complexity involved, he/she will just know there is a button "denoise", in one embodiment). For other light microscopy, such as bright field, the user will use the "raw" models.
- The user might decide that he/she is not happy with the current denoising setting. For example, the user might be experimenting with some delicate stem cells, so he/she needs better quality in the denoising. In one embodiment, the user uses another button, e.g. called "train denoiser". The user decides on some positions in the sample (where images will be acquired) and a general configuration (objective and channel, which corresponds to the camera), then clicks and images are acquired at different SNR, similar as in the factory protocol.
- The "fluo" model is used as pretrained model, and the new model is tuned on top of it (saving time to the user). The user only cares about reusing this new model.

It shall be appreciated that other embodiment of the invention may comprise only a subset of the above steps. Moreover, the mentioned buttons on the microscope serve for illustration in the above explanation, and it shall be understood that the concepts of the described embodiments might be equally realized with other types of user input mechanisms.

In the following, one embodiment of a pre-defined protocol for obtaining the images will be explained. Some embodiments may involve using an auto-illumination model, e.g. as disclosed in international patent application PCT/EP2020/072057 titled "Steuerverfahren für ein Mikroskop". For example, the model may allow to acquire images with a specific SNR. Generally, SNR is relative to the number of photons per pixel. The photons per pixel can be inferred using a formula after getting an image.

An exemplary embodiment comprises a set of instructions as follows:

1) Prepare a job in the microscope that selects a specific group of general settings:
- Cameras present simultaneously, each camera needs its model
- Objective lenses, in case of fluorescence, a model is needed for each objective lens (an image at 10× looks different that an image at 63× and the model is going to be sample dependent, and also each objective has different SNA; it may also be helpful to consider immersion with oil/water)

Other Elements

For simplification purposes, embodiments of the invention have been described in connection with one model. However, this model may comprise multiple models. For example, if the cameras are from the same manufacturer and the difference between them is minimal, the respective models may be condensed into one model per camera.

The total number of models could be for example: number of cameras*number of objectives (which will be referred to as a general "noise" configuration).

2) Prepare for each job a group of specific settings. The auto-illumination model fixes the gain and other complex factors associated to illumination. Thus, a gradient of images just needs to be specified at different SNRs. For example, it may be specified that 20 images are needed, from "very noisy" to "no noise". Without the auto-illumination used in certain embodiments, this implies to fix a gradient of exposure times, and for each exposure time, increase the intensity of light, and adjust the laser gain respectively.

3) The images are then fed to the CNN, which trains until the model converges. If the results are not satisfactory, steps 2 and 3 can be repeated iteratively until the images in the output are satisfactory.

Figure 3:
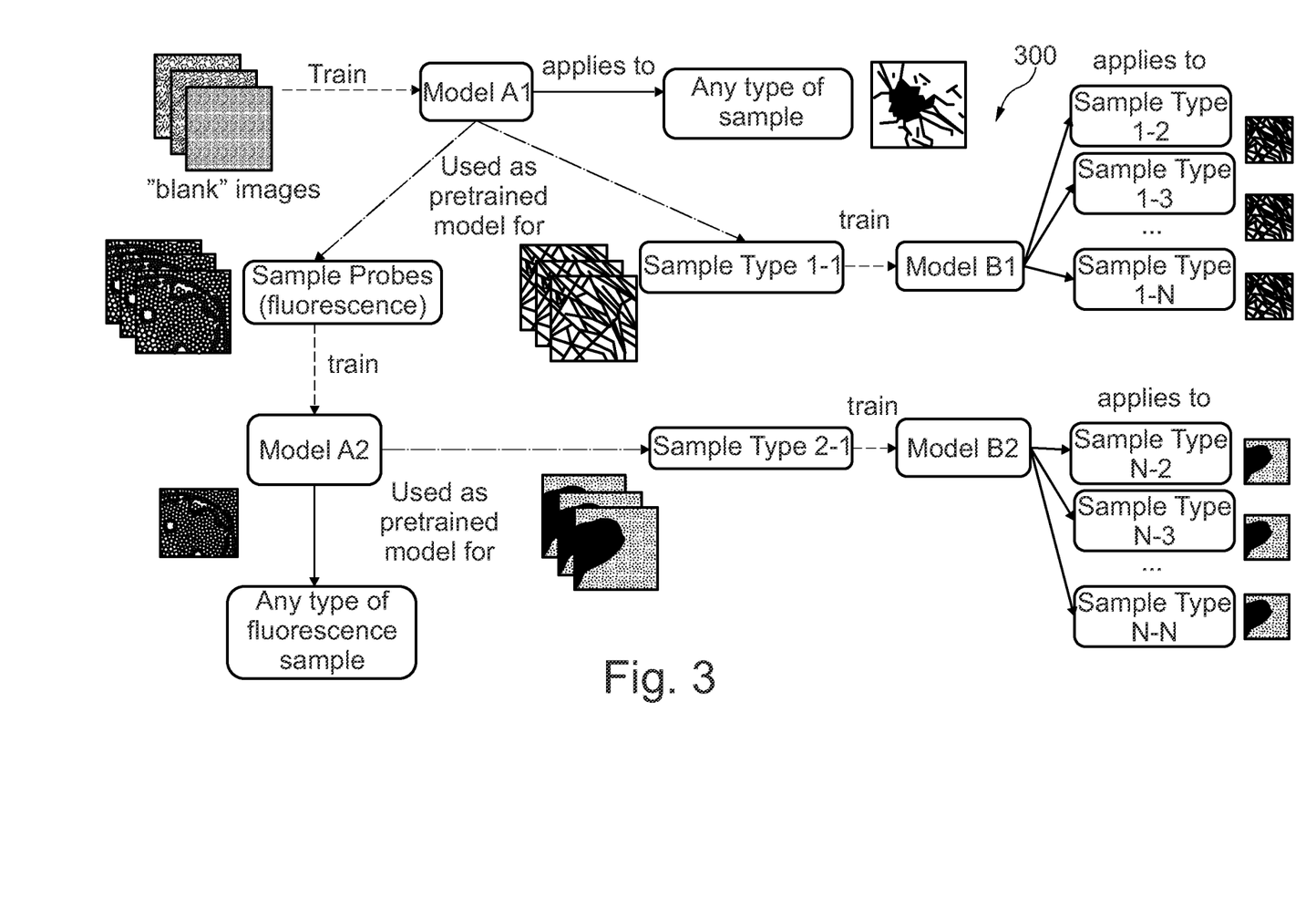
FIG. 3 illustrates an example use of a denoising model for various sample types in accordance with embodiments of the invention.

FIG. 3 shows a process 300 according to embodiments of the invention in which the denoising model 102 is used in several scenarios. In particular, as illustrated, there are four paths possible through the flow of FIG. 3:

1. Blank images may be taken using the protocol in the factory and used to train a model A1. The model A1 may then be used to denoise any type of sample, and removes part of the independent additive noise coming from the electronics.

2. Images taken from probes at the factory (labelled "Sample Probes" in FIG. 3) using the protocol by the factory or user may be used with the pretrained model A1 as a basis to train a Model A2. The model A2 may then be used for fluorescence samples, and removes the noise coming from fluorescence (at least partially).

3. Images taken from the same sample in the lab using the protocol by user may be used with the pretrained model A1 as a basis to train a Model B1. The model B1 may achieve the best quality for the corresponding sample type.

4. Images taken from the same sample in the lab using the protocol by user may be used with the pretrained model A2 as a basis to train a Model B2. The model B2 may achieve the best quality for corresponding fluorescence samples.

It is also possible to use the hardware-specific denoising model as a basis for continuous learning of noise specific to the sample, re-using the same training method as before, but tuning to specific experiments.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Figure 4:
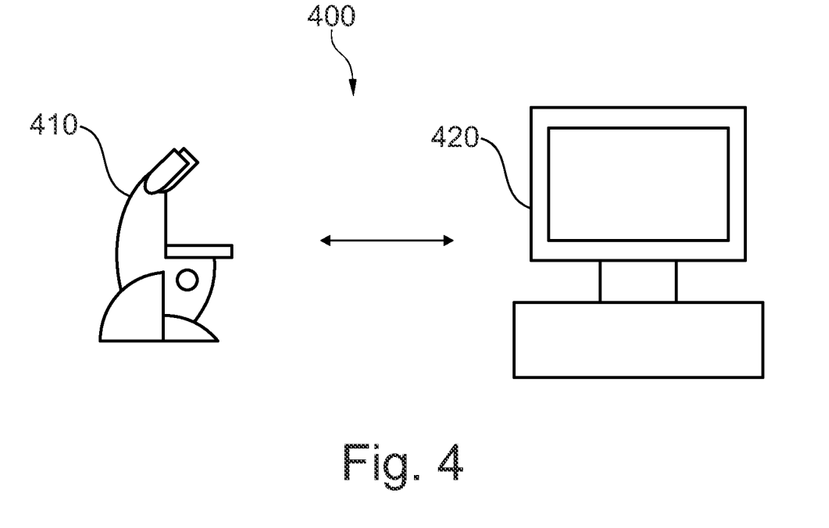
FIG. 4 illustrates a block diagram of a system in which embodiments of the invention can be performed.

Some embodiments relate to a microscope comprising a system as described in connection with one or more of the FIGS. 1 to 3. Alternatively, a microscope may be part of or connected to a system as described in connection with one or more of the FIGS. 1 to 3. FIG. 4 shows a schematic illustration of a system 400 configured to perform a method described herein. The system 400 comprises a microscope 410 and a computer system 420. The microscope 410 is configured to take images and is connected to the computer system 420. The computer system 420 is configured to execute at least a part of a method described herein. The computer system 420 may be configured to execute a machine learning algorithm. The computer system 420 and microscope 410 may be separate entities but can also be integrated together in one common housing. The computer system 420 may be part of a central processing system of the microscope 410 and/or the computer system 420 may be part of a subcomponent of the microscope 410, such as a sensor, an actor, a camera or an illumination unit, etc. of the microscope 410.

The computer system 420 may be a local computer device (e.g. personal computer, laptop, tablet computer or mobile phone) with one or more processors and one or more storage devices or may be a distributed computer system (e.g. a cloud computing system with one or more processors and one or more storage devices distributed at various locations, for example, at a local client and/or one or more remote server farms and/or data centers). The computer system 420 may comprise any circuit or combination of circuits. In one embodiment, the computer system 420 may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), for example, of a microscope or a microscope component (e.g. camera) or any other type of processor or processing circuit. Other types of circuits that may be included in the computer system 420 may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The computer system 420 may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The computer system 420 may also include a display device, one or more speakers, and a keyboard and/or controller, which can include a mouse, trackball, touch screen, voice-recognition device, or any other device that permits a system user to input information into and receive information from the computer system 420.

Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

Embodiments may be based on using a machine-learning model or machine-learning algorithm. Machine learning may refer to algorithms and statistical models that computer systems may use to perform a specific task without using explicit instructions, instead relying on models and inference. For example, in machine-learning, instead of a rule-based transformation of data, a transformation of data may be used, that is inferred from an analysis of historical and/or training data. For example, the content of images may be analyzed using a machine-learning model or using a machine-learning algorithm. In order for the machine-learning model to analyze the content of an image, the machine-learning model may be trained using training images as input and training content information as output. By training the machine-learning model with a large number of training images and/or training sequences (e.g. words or sentences) and associated training content information (e.g. labels or annotations), the machine-learning model "learns" to recognize the content of the images, so the content of images that are not included in the training data can be recognized using the machine-learning model. The same principle may be used for other kinds of sensor data as well: By training a machine-learning model using training sensor data and a desired output, the machine-learning model "learns" a transformation between the sensor data and the output, which can be used to provide an output based on non-training sensor data provided to the machine-learning model. The provided data (e.g. sensor data, meta data and/or image data) may be preprocessed to obtain a feature vector, which is used as input to the machine-learning model.

Machine-learning models may be trained using training input data. The examples specified above use a training method called "supervised learning". In supervised learning, the machine-learning model is trained using a plurality of training samples, wherein each sample may comprise a plurality of input data values, and a plurality of desired output values, i.e. each training sample is associated with a desired output value. By specifying both training samples and desired output values, the machine-learning model "learns" which output value to provide based on an input sample that is similar to the samples provided during the training. Apart from supervised learning, semi-supervised learning may be used. In semi-supervised learning, some of the training samples lack a corresponding desired output value. Supervised learning may be based on a supervised learning algorithm (e.g. a classification algorithm, a regression algorithm or a similarity learning algorithm. Classification algorithms may be used when the outputs are restricted to a limited set of values (categorical variables), i.e. the input is classified to one of the limited set of values. Regression algorithms may be used when the outputs may have any numerical value (within a range). Similarity learning algorithms may be similar to both classification and regression algorithms but are based on learning from examples using a similarity function that measures how similar or related two objects are. Apart from supervised or semi-supervised learning, unsupervised learning may be used to train the machine-learning model. In unsupervised learning, (only) input data might be supplied and an unsupervised learning algorithm may be used to find structure in the input data (e.g. by grouping or clustering the input data, finding commonalities in the data). Clustering is the assignment of input data comprising a plurality of input values into subsets (clusters) so that input values within the same cluster are similar according to one or more (pre-defined) similarity criteria, while being dissimilar to input values that are included in other clusters.

Reinforcement learning is a third group of machine-learning algorithms. In other words, reinforcement learning may be used to train the machine-learning model. In reinforcement learning, one or more software actors (called "software agents") are trained to take actions in an environment. Based on the taken actions, a reward is calculated. Reinforcement learning is based on training the one or more software agents to choose the actions such, that the cumulative reward is increased, leading to software agents that become better at the task they are given (as evidenced by increasing rewards).

Furthermore, some techniques may be applied to some of the machine-learning algorithms. For example, feature learning may be used. In other words, the machine-learning model may at least partially be trained using feature learning, and/or the machine-learning algorithm may comprise a feature learning component. Feature learning algorithms, which may be called representation learning algorithms, may preserve the information in their input but also transform it in a way that makes it useful, often as a pre-processing step before performing classification or predictions. Feature learning may be based on principal components analysis or cluster analysis, for example.

In some examples, anomaly detection (i.e. outlier detection) may be used, which is aimed at providing an identification of input values that raise suspicions by differing significantly from the majority of input or training data. In other words, the machine-learning model may at least partially be trained using anomaly detection, and/or the machine-learning algorithm may comprise an anomaly detection component.

In some examples, the machine-learning algorithm may use a decision tree as a predictive model. In other words, the machine-learning model may be based on a decision tree. In a decision tree, observations about an item (e.g. a set of input values) may be represented by the branches of the decision tree, and an output value corresponding to the item may be represented by the leaves of the decision tree. Decision trees may support both discrete values and continuous values as output values. If discrete values are used, the decision tree may be denoted a classification tree, if continuous values are used, the decision tree may be denoted a regression tree.

Association rules are a further technique that may be used in machine-learning algorithms. In other words, the machine-learning model may be based on one or more association rules. Association rules are created by identifying relationships between variables in large amounts of data. The machine-learning algorithm may identify and/or utilize one or more relational rules that represent the knowledge that is derived from the data. The rules may e.g. be used to store, manipulate or apply the knowledge.

Machine-learning algorithms are usually based on a machine-learning model. In other words, the term "machine-learning algorithm" may denote a set of instructions that may be used to create, train or use a machine-learning model. The term "machine-learning model" may denote a data structure and/or set of rules that represents the learned knowledge (e.g. based on the training performed by the machine-learning algorithm). In embodiments, the usage of a machine-learning algorithm may imply the usage of an underlying machine-learning model (or of a plurality of underlying machine-learning models). The usage of a machine-learning model may imply that the machine-learning model and/or the data structure/set of rules that is the machine-learning model is trained by a machine-learning algorithm.

For example, the machine-learning model may be an artificial neural network (ANN). ANNs are systems that are inspired by biological neural networks, such as can be found in a retina or a brain. ANNs comprise a plurality of interconnected nodes and a plurality of connections, so-called edges, between the nodes. There are usually three types of nodes, input nodes that receiving input values, hidden nodes that are (only) connected to other nodes, and output nodes that provide output values. Each node may represent an artificial neuron. Each edge may transmit information, from one node to another. The output of a node may be defined as a (non-linear) function of its inputs (e.g. of the sum of its inputs). The inputs of a node may be used in the function based on a "weight" of the edge or of the node that provides the input. The weight of nodes and/or of edges may be adjusted in the learning process. In other words, the training of an artificial neural network may comprise adjusting the weights of the nodes and/or edges of the artificial neural network, i.e. to achieve a desired output for a given input.

Alternatively, the machine-learning model may be a support vector machine, a random forest model or a gradient boosting model. Support vector machines (i.e. support vector networks) are supervised learning models with associated learning algorithms that may be used to analyze data (e.g. in classification or regression analysis). Support vector machines may be trained by providing an input with a plurality of training input values that belong to one of two categories. The support vector machine may be trained to assign a new input value to one of the two categories. Alternatively, the machine-learning model may be a Bayesian network, which is a probabilistic directed acyclic graphical model. A Bayesian network may represent a set of random variables and their conditional dependencies using a directed acyclic graph. Alternatively, the machine-learning model may be based on a genetic algorithm, which is a search algorithm and heuristic technique that mimics the process of natural selection.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 100 hardware-specific denoising model training process
102 denoising model
104 microscope
106 training data acquisition step
108 training step
200 sample-specific denoising model training process
202 training data acquisition step
204 sample
206 denoising step
208 training step
300 process of reusing denoising models for similar sample types
400 system
410 microscope
420 computer

The invention claimed is:

1. A computer-implemented method for training a denoising model for a microscope, the method comprising:
obtaining a plurality of training images with different image acquisition settings taken with the microscope, the different image acquisition settings including different illumination intensities and different exposure times, the plurality of training images comprising noise caused by the microscope's hardware; and
training the denoising model using the plurality of training images obtained with the different image acquisition settings, thereby making the denoising model specific to the microscope's hardware.

2. The method of claim 1, wherein the different image acquisition settings are chosen such that the plurality of training images have different signal-to-noise ratios.

3. The method of claim 1, wherein the obtaining the plurality of training images with the different image acquisition settings is performed in accordance with a predefined protocol, the predefined protocol defining the different image acquisition settings.

4. The method of claim 3, wherein the predefined protocol defines a plurality of exposure times.

5. The method of claim 4, wherein the plurality of exposure times comprises a gradient of exposure times.

6. The method of claim 4, wherein the predefined protocol defines for each exposure time a plurality of illumination settings.

7. The method of claim 1, wherein the plurality of training images are images without a sample or images with only a sample carrier taken with the microscope.

8. The method of claim 1, wherein the denoising model is trained to take account of each camera, objective, filter, optical path and/or modality of the microscope.

9. The method of claim 8, wherein the denoising model comprises a separate model for at least some of the cameras, objectives, filters, optical paths and/or modalities of the microscope, and/or a combined model for at least some of the cameras, objectives, filters, optical paths and/or modalities of the microscope.

10. A computer-implemented method for training a first denoising model for a microscope, the method comprising:
obtaining a plurality of images of a sample with different image acquisition settings taken with the microscope, the plurality of images of the sample being denoised using a denoising model that has been trained using the method of claim 1, the plurality of images of the sample comprising noise caused by the sample;
training the first denoising model, or a copy thereof, using the plurality of images of the sample, thereby making the first denoising model, or the copy thereof, specific to the microscope's hardware and the sample.

11. The method of claim 10, wherein the obtaining the plurality of images of the sample with the different image acquisition settings is performed in accordance with a predefined protocol, the predefined protocol defining the different image acquisition settings.

12. The method of claim 11, wherein the predefined protocol is same as a protocol used to obtain the plurality of training images.

13. The method of claim 10, further comprising:
saving the trained first denoising model which is specific to the microscope's hardware and the sample for use with other samples.

14. The method of claim 13, wherein the other samples are similar types of samples to the sample.

15. The method of claim 1, wherein the image acquisition settings used for obtaining the plurality of training images comprises at least one of a gain setting, exposure time, or illumination.

16. The method of claim 1, wherein the denoising model comprises, a machine-learning model, an artificial neural network, a convolutional neural network, and/or a generative adversarial network.

17. The method of claim 16, wherein the denoising model comprises a U-Net convolutional neural network.

18. A data processing apparatus configured to carry out the method of claim 1.

19. A trained denoising model for a microscope, the model being trained in accordance with the method of claim 1.

20. A non-transitory computer-readable medium having saved thereon program code for performing the method according to claim 1 when the program code is run on a processor.

* * * * *